United States Patent [19]

Ishikawa et al.

[11] Patent Number: 4,518,733

[45] Date of Patent: May 21, 1985

[54] RUBBER COMPOSITIONS COMPRISING (1) POLYISOPRENE (2) COBALT SALT OF ROSIN (3) CARBON BLACK AND (4) SULPHUR

[75] Inventors: Yasuhiro Ishikawa, Yokohama; Kazuhiro Yamada, Isehara; Masashi Kida, Chigasaki, all of Japan

[73] Assignee: The Yokohama Rubber Co., Ltd., Tokyo, Japan

[21] Appl. No.: 577,313

[22] Filed: Feb. 6, 1984

Related U.S. Application Data

[63] Continuation of Ser. No. 440,057, Nov. 8, 1982, abandoned.

[30] Foreign Application Priority Data

Nov. 24, 1981 [JP] Japan .............................. 56-186844

[51] Int. Cl.$^3$ ................................................ C08K 3/04
[52] U.S. Cl. .................................... 524/274; 524/398; 524/495; 524/571
[58] Field of Search ............... 524/274, 398, 496, 495, 524/571

[56] References Cited

U.S. PATENT DOCUMENTS

| | | | |
|---|---|---|---|
| 2,784,165 | 3/1957 | Howland | 524/274 |
| 2,881,096 | 4/1957 | Kisbany | 524/274 |
| 2,894,924 | 7/1959 | Rockoff | 524/274 |
| 4,252,171 | 2/1981 | Imai et al. | 524/270 |
| 4,258,770 | 3/1981 | Davis et al. | 524/274 |
| 4,324,710 | 4/1982 | Davis et al. | 524/274 |
| 4,340,514 | 7/1982 | Housel | 524/274 |
| 4,340,515 | 7/1982 | Frassek et al. | 524/274 |

FOREIGN PATENT DOCUMENTS 2853858  6/1979  Fed. Rep. of Germany ...... 524/274

Primary Examiner—Herbert J. Lilling
Attorney, Agent, or Firm—Jordan and Hamburg

[57] ABSTRACT

A rubber composition comprising, in specific mixing ratios, rubber material consisting mainly of natural rubber and/or synthetic polyisoprene rubber, a cobalt salt of rosin, carbon black having specific iodine adsorbability and dibutyl phthalate absorbability, and sulphur.

4 Claims, No Drawings

RUBBER COMPOSITIONS COMPRISING (1) POLYISOPRENE (2) COBALT SALT OF ROSIN (3) CARBON BLACK AND (4) SULPHUR This application is a continuation of application Ser. No. 440,057, filed Nov. 8, 1982, now abandoned.

This invention relates to a rubber composition. More particularly it relates to a rubber composition which has satisfactory workability and will not only exhibit high hardness and high tensile properties when cured or vulcanized but also exhibit high strength of bond to steel cords when used and vulcanized with the steel cords in an attempt to produce a steel cord-reinforced rubber.

Requirements for safety, high speed adaptability, durability and the like in tires for automobiles have recently been increasingly great. To meet such great requirements, steel-reinforced tires having the steel cords in the reinforcing layer thereof have recently spread.

In general, tires for automobiles are made of a combination of various rubbers having different properties since they must be provided with various functions. Thus, rubber used in the various portions of automobile tires widely vary in properties; for example, the rubber used in one portion is soft while that used in another portion is hard. Rubbers used as steel covering rubbers, edge tapes of steel breakers, bead fillers and the like of steel reinforced tires are harder than those used in other portions of the tires in many cases. Such harder rubbers are, in general, low in tensile properties such as tensile strength or elongation at break.

It is necessary that steel cord-covering rubbers be hard and maintain high strength of bond between the steel cords and the rubber. The term "strength of bond" or "bond strength" means pull strength necessary to pull steel cords from a rubber in which they are buried. Such pull strength will be high if not only a bond between the steel cords and the rubber is satisfactory but also the steel cord-covering rubber is tough in properties. Not only resistance to belt edge separation in steel reinforced tires is not satisfactory if such pull strength is not high, but also such high bond strength in tires is necessary to reclaim the tires, such as those for trucks and buses, which are reclaimed at the tread for re-use after the tread of the tires has been worn out.

Cobalt salts of organic acids, such as cobalt naphthenate and cobalt stearate, have heretofore been used to enhance the strength of bond between rubber and steel cords in the preparation of steel cord-reinforced rubbers, however, these cobalt salts have raised problems that they will lower the strength of bond between the rubber and steel cords when the whole has been subjected to overcure or overvulcanization.

An object of this invention is to eliminate the drawbacks of the aforesaid conventional techniques and provide a rubber composition which will exhibit high bond strength when properly vulcanized or overvulcanized for use as a steel cord-covering rubber, is satisfactorily workable in its non-vulcanized state, will produce therefrom a vulcanized rubber having high hardness and high tensile properties and is used as a steel cord-covering rubber in the preparation of steel cord reinforced tires.

The present inventors made studies in an attempt to find a method which produces a desired vulcanized rubber product having high tensile properties and satisfactory strength of bond between rubber and steel cords from a rubber composition containing a large proportion of carbon black and sulphur and, as a result of their studies, they obtained the following interesting information as to the kinds and properties of rubber material and additives needed for obtaining a rubber composition which will produce the desired rubber product when vulcanized.

(1) Effect of Cobalt Salts of Organic Acids on Rubber Compositions Having a High Sulphur Content In the vulcanization of a rubber composition having a high sulphur content, the absence of an organic acid cobalt salt in the composition will result in taking much time to finish the vulcanization and slowing the increase of hardness (JIS A) and modulus for the curing time; if the vulcanizing time is prolonged enough to allow the hardness and modulus to be fully increased, then the tensile strength and elongation at break of the resulting vulcanized product will greatly decrease. On the other hand, the presence of an organic acid cobalt salt in the composition will result in accelerating the vulcanization and increasing the hardness and modulus in a short time; thus, it is possible to harden the composition under such vulcanizing conditions that the tensile strength and elongation at break are sparingly lowered.

The organic acid cobalt salts generally have such an effect as mentioned above and, particularly, rosin which is a natural resin is effective in increasing the elongation at break. Thus, cobalt salts of rosin added to a rubber composition are also effective in, and retain a capability of, prolonging the scorch time of the composition and increasing the elongation at break of the resulting vulcanized rubber product. Accordingly, the addition of a cobalt salt of rosin to the rubber composition is effective in prolonging the scorch time of the composition and increasing the vulcanizing velocity thereof and is also effective in increasing the elongation at break of the resulting vulcanized product. Among various cobalt salts of organic acids, the cobalt salt of rosin exhibits the highest bond strength.

(2) Effect of Carbon Black on Rubber Compositions Containing Both a Large Proportion of Sulphur and a Cobalt Salt of an Organic Acid It is necessary to use a reinforcing carbon black such as ISAF or HAF in order to obtain vulcanized rubber having high hardness from a rubber composition having a high carbon content. The preferred of various kinds of carbon black are those of low structure having iodine adsorbability of 70–130 mg/g and dibutyl phthalate (DBP) absorbability of 50–80 ml/100 g, the preferred carbon including carbon black ISAF-LS or HAF-LS which will enable a rubber composition containing the same to effect the highest bond to steel cords and have high elongation at break when vulcanized. In addition, if a large proportion of carbon black is used in a rubber composition, then the composition in non-vulcanized state will generally increase in viscosity thereby rendering its workability disadvantageous; however, such an increase in viscosity is less for a rubber composition using therein carbon black having iodine adsorbability and DBP absorbability respectively in the aforesaid ranges whereby the workability of the composition is made advantageous (the iodine adsorbability and DBP absorbability having been measured respectively in accordance with JIS K 6221 and JIS K 5101).

As mentioned above, a rubber composition comprising the specific carbon black, a large proportion of sulphur and a cobalt salt of rosin is satisfactory in workability and will excellently adhere to steel cords and produce therefrom a rubber product having high hardness and high tensile properties when vulcanized. The aforementioned advantages may be obtained only by using natural rubber and polyisoprene rubber as the main rubber material.

This invention is based on the above information.

The rubber composition of this invention consists essentially of, by weight, 100 parts of rubber material containing at least 80% of natural rubber and/or polyisoprene rubber, 0.02-0.8 parts of a cobalt salt of rosin, calculated as elemental cobalt, 60-100 parts of carbon black having iodine adsorbability of 70-130 mg/g and dibutyl phthalate (DBP) absorbability of 50-80 ml/100 g and 4.5-10 parts of sulphur. Such rubber compositions will exhibit high bond strength whether normally vulcanized or overvulcanized and, thus, they are suitable for use in the preparation of rubber products, such as tires, in which the degree of vulcanization varies at the different portions.

The rubber material used in this invention preferably includes natural rubber (NR), polyisoprene rubber (IR) or a mixture thereof, however, up to 20% by weight thereof may be replaced with a diene polymer such as styrene/butadiene rubber (SBR) or polybutadiene rubber (BR). The use of less than 80% by weight of said preferable rubbers (NR and/or IR) as the rubber material in this invention will exhibit a low strength of bond to steel cords (the term "strength of bond to steel cords" being hereinafter referred to simply as "bond strength").

The cobalt salt of rosin contained in the rubber composition of this invention is obtained by converting the carboxylic acids contained in rosin to cobalt salts, more particularly by reacting rosin with, for example, sodium hydroxide to obtain a sodium salt of rosin and then subjecting the thus obtained sodium salt to desalting reaction (or double decomposition) with cobalt chloride. The thus obtained cobalt salt of rosin containing 1-10% of cobalt is effective and has a softening point of 60°-110° C. The rosin used herein is a natural resin including wood rosin, gum rosin or toll oil rosin, is a mixture of resin acids such as abietic acid (about 50%) as the main component, dehydroabietic acid, neoabietic acid, isopimaric acid and palustric acid, and it has a softening point of 60°-100° C. and an acid value of 120-200. The rosin cobalt salt is used in an amount by weight of 0.02-0.8 parts, preferably 0.05-0.4 parts, calculated as elemental cobalt, per 100 parts of the rubber material. The use of less than 0.02 parts by weight of the rosin cobalt salt, calculated as elemental cobalt, will exhibit a small effect, while the use of more than 0.8 parts by weight thereof as elemental cobalt, will lower the bond strength particularly when overcured or overvulcanized.

The carbon black used in this invention is a HAF-LS type one or ISAF-LS type one and has iodine adsorbability of 70-130 mg/g and DBP absorbability of 50-80 ml/100 g. Said carbon black corresponds to S-315, N-326, N-327 or N-219 carbon black in accordance with ASTM indication. The carbon black is used in an amount by weight of 60-100 parts per 100 parts by weight of the rubber material. The use of less than 60 parts by weight of carbon black will not result in the production of a rubber product having high hardness, while the use of more than 100 parts by weight thereof will result in causing difficulties in workability of the resulting rubber composition, thus rendering the composition impractical.

Sulphur is used in an amount by weight of 4.5-10 parts per 100 parts by weight of the rubber material in this invention. The use of less than 4.5 parts by weight of sulphur will render it difficult to obtain a rubber product having high hardness, while the use of more than 10 parts by weight thereof will raise problems as to workability including the blooming of sulphur on the resulting non-vulcanized rubber composition, this also rendering the composition impractical.

In the practice of this invention, in addition to the previously mentioned additives, there may be used suitable amounts of other additives, such as zinc oxide, process oils and vulcanization accelerators, which are usually used in the rubber industry.

This invention will be better understood by the following Examples and Comparative Examples.

EXAMPLES 1-18 AND COMPARATIVE EXAMPLES 1-20

The rubber material and the additives other than the sulphur and vulcanization accelerator as indicated in Table 1, were mixed together on an ordinary Banbury mixer to obtain a master batch, after which the sulphur and vulcanization accelerator were added to the thus obtained master batch by the use of open rolls to prepare a rubber composition. The cobalt salt of rosin, that is the rosin cobalt, was prepared by the double decomposition method.

Regarding the cobalt naphthenate, cobalt stearate and rosin cobalt in Table 1 wherein the numerals indicate parts by weight of the components and additives, and those parenthesized indicate parts by weight of elemental cobalt.

The thus prepared rubber composition (non-cured) was measured for Mooney viscosity ($ML_{1+4}$) by starting the measurement after the preheating of the composition at 100° C. for one minute and then evaluating the viscosity 4 minutes after said start of measurement in accordance with JIS K 6300. The scorch time of the rubber composition was evaluated from the time needed for the torque of the composition to rise by 5 points from the minimum torque thereof at 125° C.

Then, the rubber composition was molded into sheets and vulcanized at 150° C. for 30 minutes to obtain vulcanized sheets. The thus obtained vulcanized sheets were punched to obtain JIS No. 3 dumbbels which were measured for hardness (JIS A) and tested for tensile strength, elongation at break and 100% and 300 moduli in accordance with JIS K 6301.

The rubber composition and brass-plated steel cords of the "3+9+15" structure were bonded to each other to prepare steel cord-reinforced vulcanized rubber product, the steel cords were pulled out of the thus prepared steel cord-reinforced rubber product and then the bond strength was evaluated from the pull out force and rubber retentivity in accordance with ASTM D 2229.

The results are as shown in Table 2.

TABLE 1

(Parts by weight)

| Group | I | | | | II | | | |
|---|---|---|---|---|---|---|---|---|
| Ex. and Com. Ex. No. | Com. Ex. 1 | Com. Ex. 2 | Com. Ex. 3 | Ex. 1 | Com. Ex. 4 | Com. Ex. 5 | Com. Ex. 6 | Ex. 2 |
| Components and Additives | | | | | | | | |
| Natural rubber | 100 | → | → | → | | | | |
| Polyisoprene rubber*1 | | | | | 100 | → | → | → |
| Polybutadiene rubber | | | | | | | | |
| Carbon black ISAF*2 | | | | | | | | |
| Carbon black ISAF-LS*3 | | | | | | | | |
| Carbon black HAF-HS*4 | | | | | | | | |
| Carbon black HAF*5 | 65 | | 65 | | 65 | | 65 | |
| Carbon black HAF-LS*6 | | 65 | | 65 | | 65 | | 65 |
| Zinc oxide | 10 | | | | | | | |
| Stearic acid | 2.5 | | | | | | | |
| Antioxidant*7 | 1 | | | | | | | |
| Cobalt naphthenate*8 | 2.5 (0.25) | 2.5 (0.25) | | | 2.5 (0.25) | 2.5 (0.25) | | |
| Cobalt stearate*9 | | | | | | | | |
| Rosin cobalt*10 | | | 4 (0.2) | 4 (0.2) | | | 4 (0.2) | 4 (0.2) |
| Rosin cobalt*11 | | | | | | | | |
| Rosin cobalt*12 | | | | | | | | |
| Silica | | | | | | | | |
| Resorcinol | | | | | | | | |
| Hexamethylenetetramine | | | | | | | | |
| Sulphur (insoluble)*13 | 8 | → | → | → | → | → | → | → |
| Cure accelerator (DZ)*14 | 0.8 | | | | | | | |

| Group | III | | | | | | | IV | | | |
|---|---|---|---|---|---|---|---|---|---|---|---|
| Ex. and Com. Ex. No. | Com. Ex. 7 | Com. Ex. 8 | Ex. 3 | Com. Ex. 9 | Ex. 4 | Ex. 5 | Com. Ex. 10 | Com. Ex. 11 | Com. Ex. 12 | Com. Ex. 13 | Com. Ex. 14 |
| Components and Additives | | | | | | | | | | | |
| Natural rubber | | | | | | | | 100 | | 100 | |
| Polyisoprene rubber*1 | 100 | → | → | → | → | → | → | | 100 | | 100 |
| Polybutadiene rubber | | | | | | | | | | | |
| Carbon black ISAF*2 | 65 | 65 | | | | | | | | | |
| Carbon black ISAF-LS*3 | | | 65 | | | | | | | | |
| Carbon black HAF-HS*4 | | | | 65 | | | | | | | |
| Carbon black HAF*5 | | | | | | | | 90 | | 90 | |
| Carbon black HAF-LS*6 | | | | | 65 | 65 | 65 | | 90 | | 90 |
| Zinc oxide | 10 | | | | | | | | | | |
| Stearic acid | 2.5 | → | → | → | → | → | → | → | → | → | → |
| Antioxidant*7 | 1 | | | | | | | | | | |
| Cobalt naphthenate*8 | 2.5 (0.25) | | | | | | | 4 (0.4) | → | → | → |
| Cobalt stearate*9 | | | | | | | 2.5 (0.25) | | | | |
| Rosin cobalt*10 | | 4 (0.2) | 4 (0.2) | 4 (0.2) | | | | | | | |
| Rosin cobalt*11 | | | | | 6 (0.6) | 4 (0.4) | | | | | |
| Rosin cobalt*12 | | | | | | | | | | | |
| Silica | | | | | | | | | | | |
| Resorcinol | | | | | | | | | | | |
| Hexamethylenetetramine | | | | | | | | | | | |
| Sulphur (insoluble)*13 | 8 | → | → | → | → | → | → | → | → | → | → |
| Cure accelerator (DZ)*14 | 0.8 | | | | | | | | | | |

| Group | V | | | | | | VI | | | |
|---|---|---|---|---|---|---|---|---|---|---|
| Ex. and Com. Ex. No. | Ex. 6 | Ex. 7 | Ex. 8 | Ex. 9 | Ex. 10 | Ex. 11 | Com. Ex. 15 | Ex. 12 | Com. Ex. 16 | Com. Ex. 17 |
| Components and Additives | | | | | | | | | | |
| Natural rubber | 100 | | | | | 50 | | | | |
| Polyisoprene rubber*1 | | 100 | → | → | → | 50 | 100 | → | → | → |
| Polybutadiene rubber | | | | | | | | | | |
| Carbon black ISAF*2 | | | | | | | 80 | | | |
| Carbon black ISAF-LS*3 | | | | | | | | 80 | | |
| Carbon black HAF-HS*4 | | | | | | | | | 80 | |
| Carbon black HAF*5 | | | | | | | | | | 85 |
| Carbon black HAF-LS*6 | 90 | 90 | 80 | 75 | 90 | 90 | | | | |
| Zinc oxide | 10 | | | | | | | | | |
| Stearic acid | 2.5 | → | → | → | → | → | → | → | → | → |
| Antioxidant*7 | 1 | | | | | | | | | |
| Cobalt naphthenate*8 | | | | | | | | | | |
| Cobalt stearate*9 | | | | | | | | | | |
| Rosin cobalt*10 | 6 | 6 | 6 | 6 | 3 | 6 | 6 | → | → | → |

TABLE 1-continued (Parts by weight)

| | | | | | | | | | | |
|---|---|---|---|---|---|---|---|---|---|---|
| Rosin cobalt*11 | (0.3) | (0.3) | (0.3) | (0.3) | (0.15) | (0.3) | (0.3) | | | |
| Rosin cobalt*12 | | | | | | | | | | |
| Silica | | | | | | | | | | |
| Resorcinol | | | | | | | | | | |
| Hexamethylenetetramine | | | | | | | | | | |
| Sulphur (insoluble)*13 | 8 | → | → | → | → | → | → | → | → | → |
| Cure accelerator (DZ)*14 | 0.8 | | | | | | | | | |

| Group | VII | | | | | VIII | | IX | X |
|---|---|---|---|---|---|---|---|---|---|
| Ex. and Com. Ex. No. | Ex. 13 | Ex. 14 | Ex. 15 | Ex. 16 | Ex. 17 | Ex. 18 | Com. Ex. 18 | Com. Ex. 19 | Com. Ex. 20 |
| Components and Additives | | | | | | | | | |
| Natural rubber | | | | | | | | 100 | |
| Polyisoprene rubber*1 | 100 | → | → | → | → | 80 | 70 | | 100 |
| Polybutadiene rubber | | | | | | 20 | 30 | | |
| Carbon black ISAF*2 | | | | | | | | | |
| Carbon black ISAF-LS*3 | | | | | | | | | |
| Carbon black HAF-HS*4 | | | | | | | | | |
| Carbon black HAF*5 | | | | | | | | 40 | |
| Carbon black HAF-LS*6 | 90 | → | → | → | → | 90 | 90 | | 65 |
| Zinc oxide | 10 | → | → | → | → | → | → | → | → |
| Stearic acid | 2.5 | | | | | | | | |
| Antioxidant*7 | 1 | | | | | | | | |
| Cobalt naphthenate*8 | | | | | | | | | |
| Cobalt stearate*9 | | | | | | | | | |
| Rosin cobalt*10 | | | | | | 6 (0.3) | 6 (0.3) | | |
| Rosin cobalt*11 | 1.5 (0.15) | 3 (0.3) | 6 (0.6) | | | | | | 8.5 (0.85) |
| Rosin cobalt*12 | | | | 6 (0.18) | 10 (0.3) | | | | |
| Silica | | | | | | | | 15 | |
| Resorcinol | | | | | | | | 2.5 | |
| Hexamethylenetetramine | | | | | | | | 1.5 | |
| Sulphur (insoluble)*13 | 8 | → | → | → | → | → | → | | 8 |
| Cure accelerator (DZ)*14 | 0.8 | | | | | | | | 0.8 |

Note:
Ex. = Example
Com. Ex. = Comparative Example
*1: Nipol IR 2200 (produced by Nippon Zeon Co.)
*2: ASTM indication N-220, Iodine adsorbability of 121 mg/g and DBP absorbability of 114 ml/100 g
*3: ASTM indication N-219, Iodine adsorbability of 118 mg/g and DBP absorbability of 78 ml/100 g
*4: ASTM indication N-347, Iodine adsorbability of 90 mg/g and DBP absorbability of 124 ml/100 g
*5: ASTM indication N-330, Iodine adsorbability of 82 mg/g and DBP absorbability of 102 ml/100 g
*6: ASTM indication N-326, Iodine adsorbability of 82 mg/g and DBP absorbability of 71 ml/100 g
*7: 1,3-dimethyl butyl-p-phenylene-diamine
*8: Content of elemental cobalt 10 wt. %
*9: Content of elemental cobalt 10 wt. %
*10: Content of elemental cobalt 5 wt. %
*11: Content of elemental cobalt 10 wt. %
*12: Content of elemental cobalt 3 wt. %
*13: Oil-extended insoluble sulphur (Net 8 wt. %)
*14: N,N—dicycyclohexylbenzothiazyl sulfenamide

TABLE 2

| Group | I | | | | II | | | |
|---|---|---|---|---|---|---|---|---|
| Ex. and Com. Ex. No. | Com. Ex. 1 | Com. Ex. 2 | Com. Ex. 3 | Ex. 1 | Com. Ex. 4 | Com. Ex. 5 | Com. Ex. 6 | Ex. 2 |
| Result (Properties found) | | | | | | | | |
| Properties of non-vulcanized rubber composition | | | | | | | | |
| Mooney viscosity (ML$_{1+4}$) | 96 | 76 | 104 | 83 | 120 | 104 | 104 | 84 |
| Scorch time (min.) | 12.0 | 15.2 | 18.0 | 20.6 | 10.5 | 13.0 | 12.4 | 15.3 |
| Properties of vulcanized rubber product | | | | | | | | |
| Tensile strength (Kg/cm$^2$) | 237 | 249 | 241 | 254 | 235 | 242 | 245 | 257 |
| Elongation at break (%) | 370 | 429 | 410 | 486 | 410 | 455 | 450 | 521 |
| 100% modulus (Kg/cm$^2$) | 75 | 61 | 64 | 55 | 65 | 53 | 55 | 44 |
| 300% modulus (Kg/cm$^2$) | 158 | 128 | 135 | 114 | 138 | 120 | 115 | 90 |
| Hardness (JIS A) | 81 | 79 | 82 | 81 | 80 | 78 | 81 | 79 |
| Bond test Pull out force (Kg/inch) The numerals in parentheses indicate rubber retentivity (%) | | | | | | | | |
| 150° C., 30 minutes | 105 (91) | 113 (90) | 111 (91) | 123 (93) | 100 (91) | 108 (90) | 109 (91) | 124 (94) |
| 160° C., 60 minutes | 83 (80) | 91 (90) | 92 (88) | 100 (90) | 80 (81) | 90 (90) | 87 (88) | 101 (90) |

| Group | III | | | | | IV | | | |
|---|---|---|---|---|---|---|---|---|---|
| Ex. and Com. Ex. | Com. Ex. | Com. Ex. | Ex. | Com. Ex. | Ex. | Ex. | Com. Ex. | Com. Ex. | Com. Ex. | Com. Ex. |

TABLE 2-continued

| No. | 7 | 8 | 3 | 9 | 4 | 5 | 10 | 11 | 12 | 13 | 14 |
|---|---|---|---|---|---|---|---|---|---|---|---|
| Result (Properties found) | | | | | | | | | | | |
| Properties of non-vulcanized rubber composition | | | | | | | | | | | |
| Mooney viscosity ($ML_{1+4}$) | 115 | 124 | 111 | 110 | 84 | 85 | 109 | 150 | 121 | 135 | 108 |
| Scorch time (min.) | 8.0 | 10.0 | 13.5 | 15.5 | 15.2 | 12.5 | 13.2 | 7.5 | 7.8 | 8.2 | 8.5 |
| Properties of vulcanized rubber product | | | | | | | | | | | |
| Tensile strength ($Kg/cm^2$) | 244 | 260 | 265 | 224 | 242 | 245 | 230 | 175 | 186 | 205 | 210 |
| Elongation at break (%) | 450 | 490 | 524 | 266 | 507 | 509 | 405 | 195 | 234 | 225 | 260 |
| 100% modulus ($Kg/cm^2$) | 64 | 53 | 49 | 82 | 50 | 49 | 66 | 118 | 79 | 100 | 103 |
| 300% modulus ($Kg/cm^2$) | 131 | 110 | 97 | 180 | 96 | 93 | 140 | — | 184 | 185 | 188 |
| Hardness (JIS A) | 81 | 81 | 79 | 80 | 81 | 79 | 80 | 90 | 88 | 89 | 88 |
| Bond test Pull out force (Kg/inch) The numerals in parentheses indicate rubber retentivity (%) | | | | | | | | | | | |
| 150° C., 30 minutes | 110 (95) | 114 (95) | 123 (95) | 88 (91) | 120 (95) | 124 (95) | 104 (91) | 105 (90) | 110 (94) | 109 (90) | 115 (93) |
| 160° C., 60 minutes | 85 (85) | 89 (88) | 98 (90) | 74 (67) | 96 (83) | 100 (93) | 87 (90) | 84 (80) | 94 (83) | 84 (80) | 89 (82) |

| Group | V | | | | | | VI | | | |
|---|---|---|---|---|---|---|---|---|---|---|
| Ex. and Com. Ex. No. | Ex. 6 | Ex. 7 | Ex. 8 | Ex. 9 | Ex. 10 | Ex. 11 | Com. Ex. 15 | Ex. 12 | Com. Ex. 16 | Com. Ex. 17 |
| Result (Properties found) | | | | | | | | | | |
| Properties of non-vulcanized rubber composition | | | | | | | | | | |
| Mooney viscosity ($ML_{1+4}$) | 128 | 110 | 95 | 90 | 107 | 108 | 140 | 133 | 120 | 116 |
| Scorch time (min.) | 13.2 | 13.8 | 17.3 | 18.4 | 12.3 | 13.7 | 9.6 | 13.2 | 12.5 | 15.1 |
| Properties of vulcanized rubber product | | | | | | | | | | |
| Tensile strength ($Kg/cm^2$) | 212 | 230 | 235 | 241 | 211 | 216 | 240 | 244 | 188 | 214 |
| Elongation at break (%) | 322 | 355 | 400 | 450 | 274 | 291 | 325 | 355 | 140 | 254 |
| 100% modulus ($Kg/cm^2$) | 87 | 100 | 70 | 60 | 101 | 103 | 130 | 121 | 130 | 110 |
| 300% modulus ($Kg/cm^2$) | 158 | 175 | 150 | 136 | 187 | 187 | 201 | 179 | — | 190 |
| Hardness (JIS A) | 89 | 89 | 84 | 82 | 88 | 90 | 90 | 88 | 89 | 89 |
| Bond test Pull out force (Kg/inch) The numerals in parentheses indicate rubber retentivity (%) | | | | | | | | | | |
| 150° C., 30 minutes | 127 (92) | 120 (91) | 128 (90) | 125 (94) | 120 (91) | 121 (88) | 122 (90) | 125 (90) | 84 (98) | 104 (89) |
| 160° C., 60 minutes | 102 (89) | 100 (95) | 101 (90) | 101 (90) | 97 (71) | 104 (89) | 87 (70) | 101 (88) | 70 (66) | 92 (64) |

| Group | VII | | | | | VIII | | IX | X |
|---|---|---|---|---|---|---|---|---|---|
| Ex. and Com. Ex. No. | Ex. 13 | Ex. 14 | Ex. 15 | Ex. 16 | Ex. 17 | Ex. 18 | Com. Ex. 18 | Com. Ex. 19 | Com. Ex. 20 |
| Result (Properties found) | | | | | | | | | |
| Properties of non-vulcanized rubber composition | | | | | | | | | |
| Mooney viscosity ($ML_{1+4}$) | 103 | 107 | 110 | 104 | 103 | 105 | 102 | 80 | 82 |
| Scorch time (min.) | 11.3 | 11.8 | 12.5 | 15.8 | 16.9 | 13.9 | 14.2 | 18.7 | 15.5 |
| Properties of vulcanized rubber product | | | | | | | | | |
| Tensile strength ($Kg/cm^2$) | 234 | 214 | 210 | 218 | 200 | 208 | 181 | 268 | 227 |
| Elongation at break (%) | 300 | 304 | 308 | 331 | 389 | 308 | 270 | 515 | 451 |
| 100% modulus ($Kg/cm^2$) | 92 | 95 | 92 | 87 | 73 | 98 | 95 | 34 | 52 |
| 300% modulus ($Kg/cm^2$) | 179 | 171 | 160 | 164 | 131 | 170 | 166 | 85 | 100 |
| Hardness (JIS A) | 87 | 89 | 91 | 88 | 88 | 88 | 87 | 72 | 82 |
| Bond test Pull out force (Kg/inch) The numerals in parentheses indicate rubber retentivity (%) | | | | | | | | | |
| 150° C., 30 minutes | 124 (91) | 122 (90) | 128 (91) | 226 (90) | 120 (87) | 105 (95) | 95 (96) | 105 (88) | 115 (88) |
| 160° C., 60 minutes | 98 (87) | 100 (88) | 108 (84) | 106 (75) | 111 (80) | 85 (95) | 72 (90) | 80 (82) | 79 (65) |

Note:
Ex. = Example
Com. Ex. = Comparative Example

The rubber compositions of Groups I-III are those comprising NR or IR, 65 parts by weight of carbon black and a large proportion of sulphur.

(1) The rubber compositions of Group I are those respectively comprising different kinds of carbon black and organic acid cobalt salts. In this Group, the rubber compositions of Comparative Example 3 and Example 1 each comprising rosin cobalt (5 wt. % content of elemental cobalt) have a longer scorch time than those of Comparative Examples 1-2 comprising cobalt naphthenate. In addition, when comparing the vulcanized rubber products of Comparative Examples 1 and 2 each containing the same carbon black in the same amount, it is found that the latter is improved in elongation at break and bond strength. This is also found true when comparing the vulcanized rubber products of Comparative Example 2 and Example 1 each containing the same carbon black in the same amount. On the other hand, the rubber composition of Comparative Example 3 comprising HAF as the carbon black is inferior in scorch time, elongation at break and bond strength to that of Example 1 comprising HAF-LS as the carbon black. These facts indicate that in the NR-containing rubber compositions, the combined use of rosin cobalt and carbon black HAF-LS will result in the prolongation of scorch time and in the production of vulcanized rubber products which are excellent in tensile properties and bond strength, particularly bond strength obtained when overvulcanized.

(2) The rubber compositions of Group II are the same in constitution as those of Group I except that IR is substituted for NR. When comparing the compositions of Group II with each other, approximately the same result is obtained as in Group I and it shows that the vulcanized rubber products of Group II are generally greater in elongation at break than those of Group I.

(3) The rubber compositions of Group III are IR-containing ones respectively comprising further different kinds of carbon black and different proportions of different organic acid cobalt salts. The rubber compositions of Comparative Examples 7 and 8 are those respectively comprising carbon black ISAF and cobalt naphthenate, and carbon black ISAF and rosin cobalt; they have a short scorch time and produce therefrom vulcanized rubber products having low elongation at break for IR type vulcanized rubber. In addition, when properly vulcanized or overvulcanized, they will produce vulcanized rubber products having lower bond strength than those of Examples 3–5. The rubber composition of Example 3 comprises both carbon black ISAF-LS and rosin cobalt and has a long scorch time and the vulcanized rubber product of the same Example is excellent in tensile properties and bond strength. Comparative Example 9 indicates the combined use of carbon black HAF-HS and rosin cobalt and also indicates that the vulcanized rubber product is very inferior in elongation at break and considerably inferior in bond strength. Examples 4–5 indicate the use of carbon black HAF-LS and rosin cobalt (content of elemental cobalt 10 wt. %) which is different in amount used from that used in Examples 1–3, and they indicate that approximately the same desirable result as in Example 3 is obtained. Comparative Example 10 indicates the use of carbon black HAF-LS and cobalt stearate and the vulcanized rubber product obtained in this case are inferior in tensile strength, elongation at break and bond strength to those obtained in Examples 3–5.

It is seen from the above that the IR-type rubber compositions comprising IR, carbon black HAF-LS or ISAF-LS and rosin cobalt have a long scorch time and will form a vulcanized rubber product having desirable tensile properties and bond strength when vulcanized.

The rubber compositions of Groups IV–VII are NR-type or IR-type ones comprising a large proportion of carbon black.

(4) The rubber compositions of Group IV are NR-type or IR-type ones comprising carbon black HAF or HAF-LS in a large proportion and cobalt naphthenate, and they have a short scorch time. On the other hand, the vulcanized rubber products of the same Group have increased hardness and modulus due to the presence of a large proportion of carbon black therein and are very inferior in elongation at break and bond strength.

(5) The rubber composition of Group V are NR-type, IR-type or NR/IR mixed type ones comprising carbon black HAF-LS in a large proportion and rosin cobalt (content of elemental cobalt 5 wt. %). The rubber compositions of Examples 6–7 are NR-type and IR-type ones, respectively, and they have a longer scorch time than those of Comparative Examples 12 and 14 comprising cobalt naphthenate. The vulcanized rubber products of said Examples have increased tensile strength and elongation at break as compared with those of said comparative Examples. The former also have improved bond strength. The rubber compositions of Examples 7–8 comprises carbon black HAF-LS in a smaller amount than that of Example 7. In Examples 7–8, as the amount of carbon black contained decreases, the vulcanized rubber products somewhat decrease in hardness and modulus, however, the rubber compositions have a further long scorch time; thus, the vulcanized rubber products have increased tensile strength and elongation at break and the same bond strength. Example 7 indicates a NR/IR mixed type rubber composition and it shows that the same effect as obtained in Examples 6–10 is achieved.

(6) The rubber compositions of Group VI are IR-type ones respectively comprising rosin cobalt (content of elemental cobalt 5 wt. %) and a large proportion of different kinds of carbon black. The rubber composition of Comparative Example 15 comprising carbon black ISAF has a short scorch time and will form a vulcanized rubber product having inferior bond strength when overvulcanized. The vulcanized rubber products of Comparative Examples 16 and 17 respectively comprising carbon black HAF-HS and carbon black HAF have remarkably low tensile strength and elongation at break as well as inferior bond strength. On the other hand, the rubber composition of Example 12 comprising carbon black ISAF-LS has a long scorch time and will form a vulcanized rubber product having desirable tensile properties and bond strength when vulcanized. This indicates that IR-type rubber compositions which achieve desirable effects are only those comprising carbon black of low structure.

(7) The rubber compositions of Group VII are IR-type ones respectively comprising a large proportion of carbon black HAF-LS and different amounts of rosin cobalts having different contents of elemental cobalt. The rubber compositions of Examples 13–15 comprise rosin cobalt (having a 10 wt. % content of elemental cobalt) in such respective amounts that the contents of elemental cobalt in the compositions are as shown in Table 1. The rubber compositions of Examples 16–17 comprise rosin cobalt (having a 3 wt. % content of elemental cobalt) in such respective amounts that the contents of elemental cobalt in the compositions are as shown in Table 1. The rubber compositions of Examples 13–17 have a long scorch time and will form a vulcanized rubber product having desirable properties and bond strength when vulcanized.

(8) The rubber compositions of Group VIII are IR/BR mixed type ones respectively comprising a large proportion of carbon black HAF-LIS and rosin cobalt (content of elemental cobalt 5 wt. %). The rubber composition of Example 18 comprising 20% by weight of BR has a long scorch time and will, when vulcanized, a vulcanized rubber product having desirable tensile properties and high rubber retentivity although the product is somewhat inferior in bond strength or pull strength; thus, the rubber product is desirable in properties as a whole. The rubber composition of Comparative Example 18 comprises 30 wt. % of BR and the vulcanized rubber product obtained therefrom is inferior in tensile properties and bond strength to that of Example 18. This indicates that the rubber compositions of this invention should comprise at least 80% by weight of NR and/or IR to achieve the desired effects.

(9) The rubber composition of Group IX, that is Comparative Example 19, is a NR-type rubber composition comprising resorcinol, silica and hexamethylenetetramine. This composition has a long scorch time, however, the vulcanized rubber product obtained therefrom has remarkably low modulus, hardness and bond strength.

(10) The rubber composition of Group X, that is Comparative Example 20, comprises the same rosin cobalt as that of Examples 4–5, in an amount larger than the rubber compositions of Examples 4-5, however, the vulcanized rubber product of Group X is inferior in bond strength. This indicates that the amount of rosin cobalt added should preferably be 0.8 parts by weight, calculated as elemental cobalt, per 100 parts by weight of the rubber material.

As mentioned above, the rubber composition of this invention which comprises natural rubber and/or isoprene rubber as the main rubber material, carbon black having iodine adsorbability of 70-130 mg/g and DBP absorbability of 50-80 ml/100 g, a large proportion of sulphur and a specific proportion of cobalt salt of rosin, are advantageous in scorch time in the non-vulcanized state and will produce therefrom a vulcanized rubber product having high hardness and excellent tensile properties when vulcanized. Further, when the rubber compositions of this invention are used and vulcanized as a steel cord-covering rubber, the resulting vulcanized rubber product will exhibit high bond strength whether the rubber compositions are properly vulcanized or overvulcanized.

What is claimed is:

1. A rubber composition for tires consisting essentially of, by weight, 100 parts of synthetic polyisoprene rubber, 0.02-0.8 parts of a cobalt salt of rosin, calculated as elemental cobalt, 60-100 parts of carbon black having iodine adsorbability of 70-130 mg/g and dibutyl phthalate adsorbability of 50-80 ml/100 g, and 4.5-10 parts of sulfur.

2. A composition as set forth in claim 1 wherein said cobalt salt of rosin is the product of reacting rosin with an alkali metal hydroxide followed by reacting the resulting rosin compounds with cobalt halide.

3. A composition as set forth in claim 2 wherein said alkali metal hydroxide is sodium hydroxide and the cobalt halide is cobalt chloride.

4. A rubber composition for tires comprising, by weight, 100 parts of synthetic polyisoprene rubber, 0.02-0.8 parts of a cobalt salt of rosin as the only organic salt, calculated as elemental cobalt, 60-100 parts of carbon black having iodine adsorbability of 70-130 mg/g and dibutyl phthalate absorbability of 50-80 ml/100 g, and 4.5-10 parts of sulfur.

* * * * *